United States Patent [19]

Bernacchia, Jr.

[11] 4,231,144
[45] Nov. 4, 1980

[54] METHOD OF CONVERTING A VAN-TYPE VEHICLE TO A MULTI-PASSENGER COMMERCIAL TRANSPORTATION VEHICLE

[75] Inventor: George Bernacchia, Jr., Yonkers, N.Y.

[73] Assignee: National Custom Van Corp., Yonkers, N.Y.

[21] Appl. No.: 7,940

[22] Filed: Jan. 31, 1979

[51] Int. Cl.² .................. B23P 6/00; B23P 17/00; B23P 19/00

[52] U.S. Cl. .................... 29/401.1; 29/415; 29/426.4; 29/428; 296/178

[58] Field of Search .......... 29/401.1, 416, 415, 29/426, 428; 296/178, 26

[56] References Cited

U.S. PATENT DOCUMENTS

| | | | |
|---|---|---|---|
| 8,119 | 5/1851 | Hoyt | 280/163 |
| D. 207,399 | 4/1967 | Elgin et al. | D12/99 |
| D. 208,151 | 7/1967 | Long | D12/156 |
| D. 213,189 | 1/1969 | Ritter et al. | D12/156 |
| D. 217,815 | 6/1970 | Patterson et al. | D12/156 |
| D. 217,960 | 7/1970 | Schilling | D12/156 |
| D. 227,242 | 6/1973 | Hanson | D12/100 |
| D. 230,019 | 1/1974 | Cox | D12/99 |
| D. 232,083 | 7/1974 | Lano | D12/100 |
| D. 239,101 | 3/1976 | Baer | D12/100 |
| 1,072,096 | 9/1913 | Dean | 362/76 |
| 1,612,839 | 1/1927 | Shields | 296/146 |
| 1,707,311 | 4/1929 | Masury | 296/185 |
| 2,255,880 | 9/1941 | Gregorie | 292/233 |
| 2,540,859 | 2/1951 | Birkin | 29/401.1 X |
| 2,555,556 | 6/1951 | Panzegrau et al. | 180/315 |
| 2,816,794 | 12/1957 | Temp | 29/401.1 |
| 2,822,055 | 2/1958 | Ludowici | 180/14 R |
| 3,004,619 | 10/1961 | Straussler | 180/208 |
| 3,116,085 | 12/1963 | Uttley | 296/26 |
| 3,254,734 | 6/1966 | Behrmann | 180/19 R |
| 3,309,759 | 3/1967 | Vittone | 29/401.1 X |
| 3,501,194 | 3/1970 | Frank | 296/156 |
| 3,659,893 | 5/1972 | Steele | |
| 3,700,057 | 10/1972 | Boyd et al. | |
| 3,710,965 | 1/1973 | Jooster | |
| 3,730,582 | 5/1973 | Lieffring | 29/401.1 X |
| 3,770,289 | 11/1973 | Dougherty et al. | |
| 3,802,732 | 4/1974 | McKee | 296/26 X |
| 3,850,472 | 11/1974 | Greppi | |
| 3,905,638 | 9/1975 | Persico | 296/178 X |
| 3,907,357 | 9/1975 | Davis | 296/178 X |
| 4,033,625 | 7/1977 | Fikse | |
| 4,099,313 | 7/1978 | Phillips | 296/26 X |

*Primary Examiner*—Charlie T. Moon
*Attorney, Agent, or Firm*—Brumbaugh, Graves, Donohue & Raymond

[57] ABSTRACT

A method for converting a standard, production van-type vehicle to a multi-passenger commercial transportation vehicle whereby the chassis body, front passenger door and roof of a production van-type vehicle are transformed to a new commercial multi-passenger vehicle which is convenient to board and unboard under driver control, which permits upright passenger mobility, and which at the same time is structurally secure.

11 Claims, 8 Drawing Figures

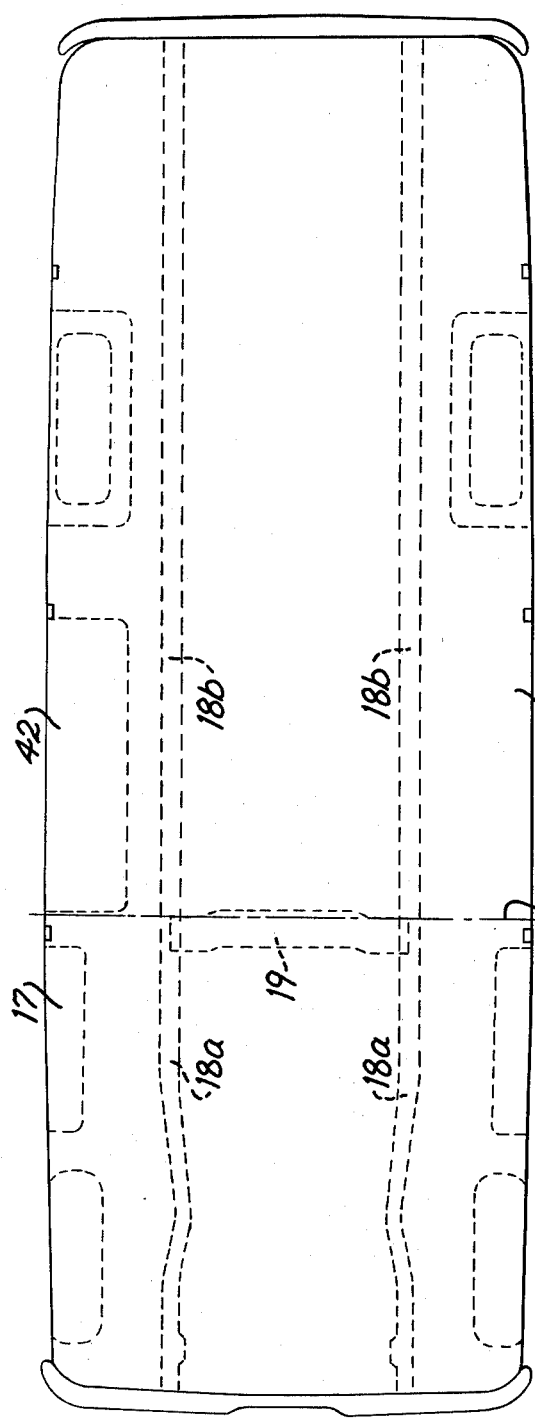
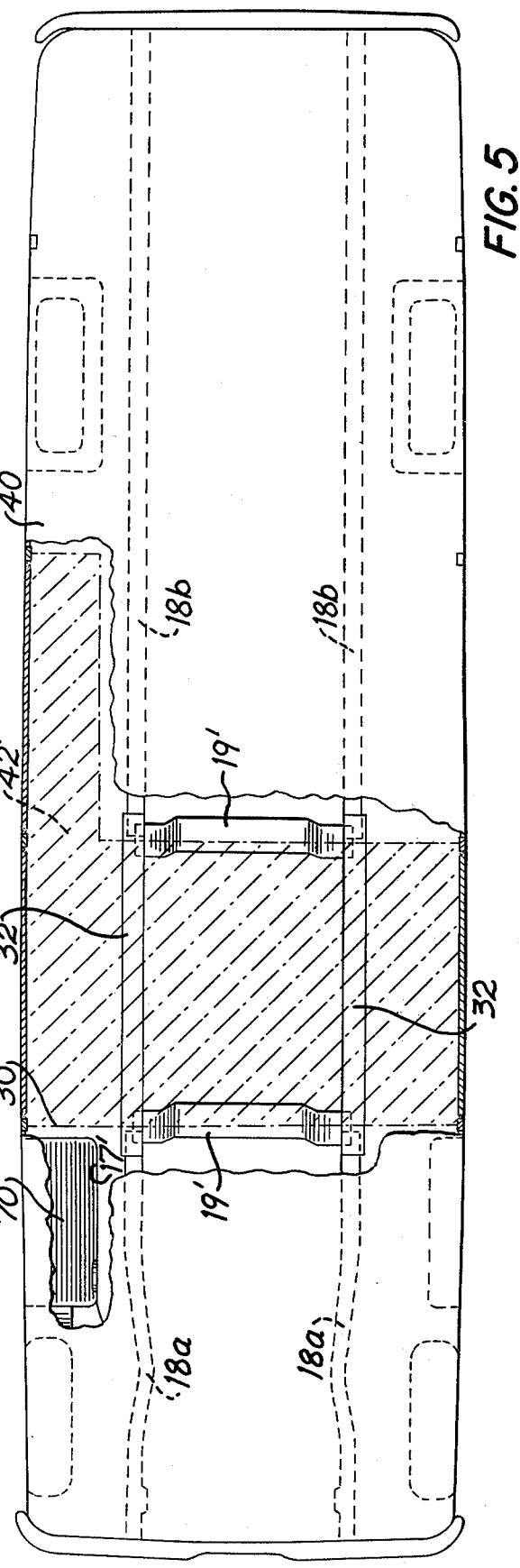

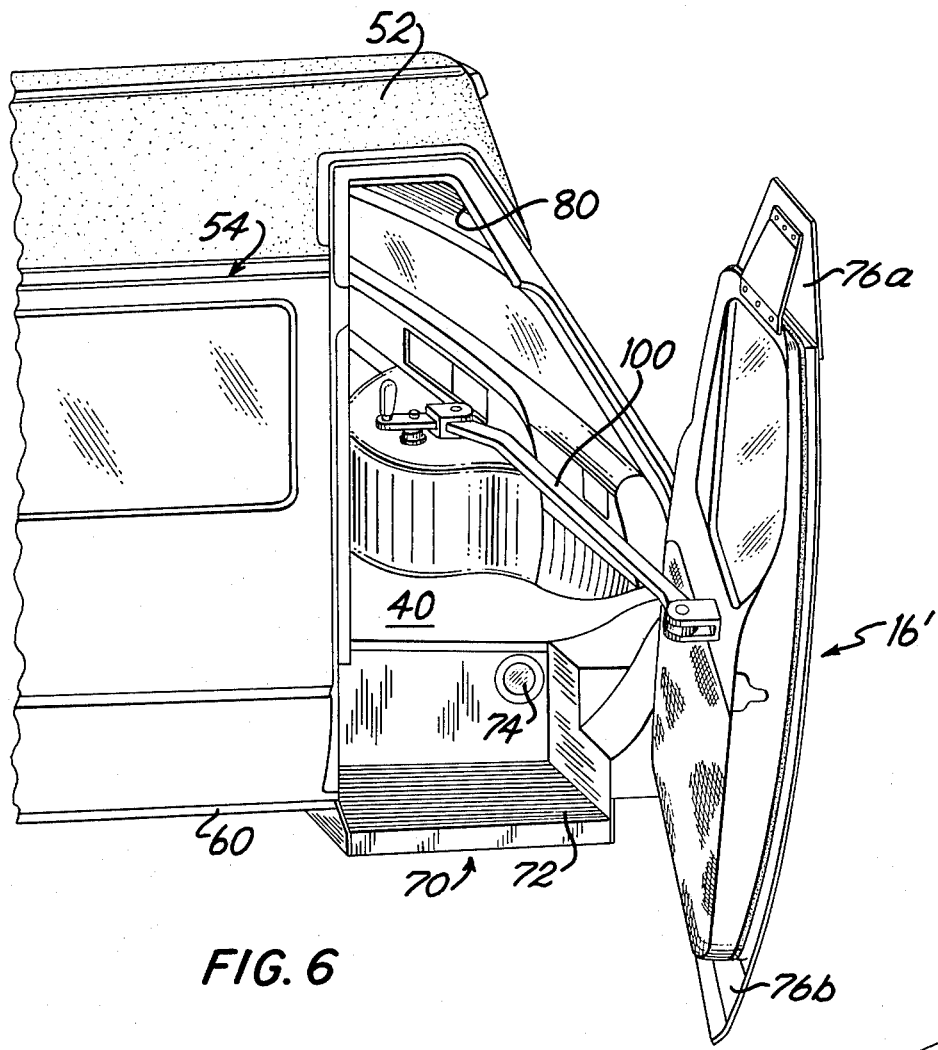
FIG. 6
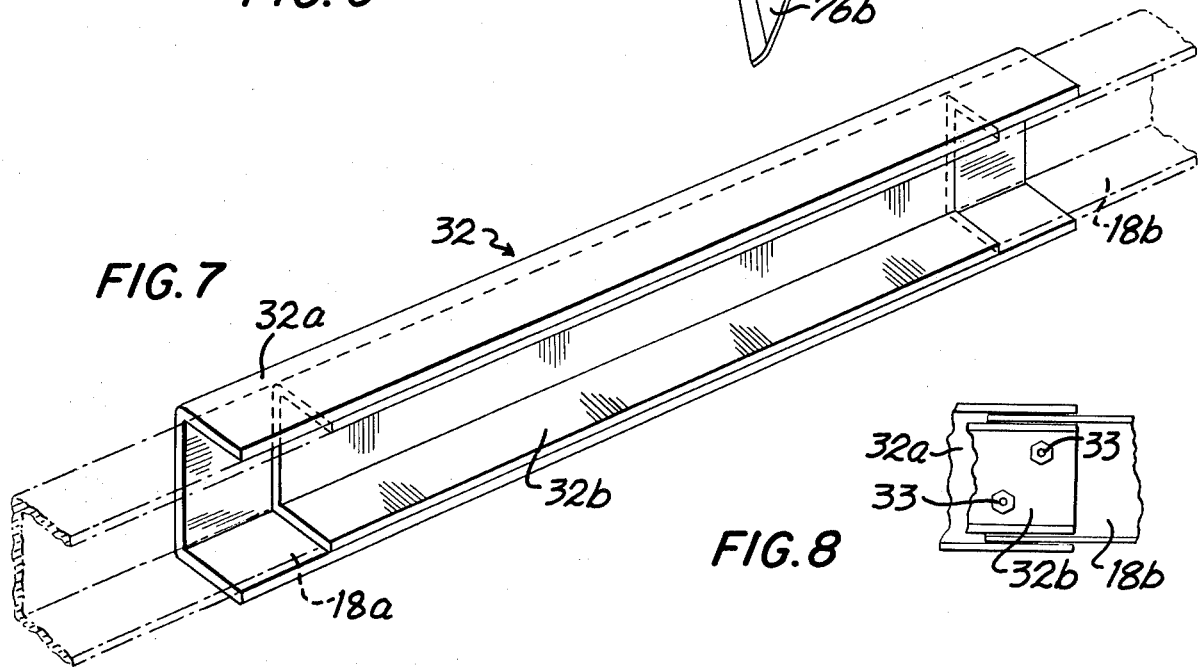
FIG. 7
FIG. 8

METHOD OF CONVERTING A VAN-TYPE VEHICLE TO A MULTI-PASSENGER COMMERCIAL TRANSPORTATION VEHICLE

BACKGROUND OF THE INVENTION

The present invention relates to van-type vehicles and a method of converting standard production van-type vehicles into commercial multi-passenger transportation vehicles.

Van-type passenger vehicles, as currently manufactured by most auto makers, are designed for the transportation of light commercial cargo or for passengers, and generally have overall dimensions equivalent to a full size passenger automobile. As such, production van-type vehicles are generally unsuited for service as commercial passenger carrying vehicles. Nevertheless, they have to some extent come into increasing use because there has been great demand for a commercial vehicle having an intermediate passenger-carrying capability in instances where the passenger carrying capabilities of a full size bus, usually designed to carry 40 or more passengers, is uneconomical, but an automobile limosine is too small. Common instances where standard van-type vehicles have been used in place of a bus include school transportation, company interplant shuttle services, hotel and car rental shuttle services, and passenger transportation to and from airports.

The primary problem of the use of standard production vans for commercial passenger transportation lies in the fact that the interior space of the vehicle is relatively cramped, and boarding and unboarding are relatively difficult when compared with full size commercial passenger ground transportation, e.g. buses or trains. Standard van-type vehicles are normally accessible to passengers only through either the front seat passenger door or a cargo door or doors on the side of the vehicle which open up to the back portion of the van. Moreover, entrance through the passenger door to the back of the vehicle is usually impractical since passengers would have to climb over the front seat upon entering. On the other hand, entry through the cargo door is awkward since the passenger must mount a relatively high step (at the level of the rocker panels) when climbing into the van. Once inside the vehicle, the ceilings are too low to permit upright movement about the vehicle interior. This makes it particularly inconvenient for a passenger carrying baggage, both in trying to climb into the van and in stowing the luggage. There is also a general lack of space in the passenger-carrying portion of the vehicle behind the driver's seat, which not only creates a sense of confinement and crowding for the passenger, but for the owner limits passenger-carrying capability. Contributing to this lack of space is the fact that space adjacent the cargo door must be left to enter and leave the van. Also, and quite significantly, the cargo door is removed from the vicinity of the driver's seat and therefore out of the control of the vehicle operator, which is unacceptable in many applications, and certainly where fare paying customers are involved.

In an effort to alleviate some of these problems, a variety of modifications and apparatus have been proposed in the past to adapt standard vans for commercial passenger use. In one such modification, disclosed in U.S. Pat. No. 3,905,638 to Persico, the standard roof is removed and a new roof affording additional headroom is attached, affording more freedom of movement once inside the van. Also, there have been proposals to modify the cargo door entrance way to ease the problem of entering and leaving the vehicle, for example using step wells as shown in U.S. Pat. No. 3,907,357 to Davis, which are similar to those developed for horsedrawn carriages.

However, these and other efforts to modify production van-type vehicles for commercial passenger transportation suffer serious drawbacks. Each of these vehicles retains one or more of the shortcomings described above, and conveys to the passenger a sense of a makeshift adaptation for commercial passenger operation. Known van adaptations possess the interior space limitations necessitated by the standard body size of van vehicles and loss of space from the use of the side cargo door for passenger entry. In addition, the production side cargo doors are not designed for easy opening and frequency of use as are contemplated in commercial passenger carrying operations. Some of the proposed modifications to the cargo door entrance ways are not only substantial and thus expensive, but result in a weakening of the vehicle body and a resulting flimsy structure, which requires substantial reinforcing of the frame. Even with such reinforcing, the door still often tends to rattle and eventually work itself loose. Finally the operator of the vehicle has no control over the cargo-passenger door from the driver's seat, and thus cannot open the door to let passengers in and out of the van without stopping and securing the vehicle, getting out of the van, and walking around to the other side. This drawback is especially troublesome in attempting to operate service in a commercially congested area, such as an airport. For the passengers to open and close the door themselves not only is unsafe and thus increases the risk of accident, but also, in a commercial and competitive service oriented operation, is simply unacceptable.

SUMMARY OF THE INVENTION

The present invention is a method of converting a standard, production van-type vehicle to a multi-passenger transportation vehicle which offers the individual passenger room, comfort and convenience of full size ground transportation, and at the same time offers practical, economical, and therefore commercially feasible intermediate size transportation service. A vehicle manufactured in accordance with the present invention possesses the advantages needed for commercial operation, including easy entrance and exit from the vehicle through a driver operated door out of the way of the passenger compartment, interior roominess enabling passengers to move about the cabin, and added passenger and baggage handling capabilities over the standard type van. Moreover, a van modified in accordance with the present invention is structurally sound, and exhibits a good service life without structural depreciation. These features have heretofore been unattained in the modification of production van-type vehicles, requiring instead redesigning and rebuilding, at great expense, from the ground up.

More particularly, the present method is comtemplated for converting a standard production van having a chassis carrying a vehicle body and having one or more longitudinal support members extending substantially the length of the vehicle as part of the chassis. The vehicle body normally has a driver door and a passenger door adjacent the front seat of the vehicle, and an auxiliary cargo door on one side of the vehicle behind either the driver or the passenger door.

In accordance with the present invention, a standard van-type vehicle of the type contemplated is cut in a plane substantially transverse of the longitudinal support members to divide the chassis and the vehicle body into a forward section and a rear section. The cut is made between the forward and rear wheels of the van, preferably right behind the front doors of the van and forward of the cargo door. The two sections of the vehicle are separated, and chassis extension support members are attached coaxially between the forward and rear sections of each of the longitudinal support members to reinforce and extend the chassis. The roof portion of the vehicle is cut off along the periphery of the upper vehicle body and removed. Thereafter, an upwardly enlarged roof, which may be formed of fiberglass or molded plastic, having upwardly extending sides to add headroom inside the vehicle, is attached to the vehicle along the roof periphery in place of the original roof.

In addition to the chassis and roof, the vehicle body itself is transformed. The cargo door is welded and sealed in place in its closed position, and will thus generally be flush with the sides of the vehicle body. Sidewalls are attached extending between the forward and rear sections of the vehicle flush with the existing sidewalls (and cargo door sidewall) of the forward and rear sections. The sidewalls may generally be another side panel member, which are available as standard replacement parts. In this form, the vehicle body will now be a rigid unitary member structurally, and is in a form for final sanding and cosmetic finishing so the entire side of the vehicle also appears to be unitary.

Entrance into the vehicle for passengers is no longer through the cargo door, but is now permitted through the front passenger door. The front passenger seat is removed, along with a portion of the vehicle floor in the vicinity of the door. In place of the removed flooring, a step well is positioned to form a continuation of the passenger door opening, and thereafter attached to the vehicle. The entranceway is further enlarged by forming a roof cutout extending partially upward from the periphery of the roof in the area above the step well, as a continuation of the passenger door opening. In order to seal off the enlarged passenger door entrance, extension members are added to the upper and lower ends of the passenger door to cover the opening when the door is in the closed position. Also, vehicle flooring is added to cover over the exposed floor portions between the forward and rear sections of the body, and adjacent the cargo door (space no longer needing to be left for exiting through the cargo door). As thus adapted, the passenger may step up into the vehicle and leave the vehicle easily, without having to bend over or without having to take a full step up to the relatively high van interior floor, as would normally be required, to get into the vehicle. At the same time, once in the vehicle, sufficient headroom is provided that the passenger may stand upright and move about.

As is apparent, since the passenger entrance door is now the front passenger door, which is within easy reach of the driver, drive control of the door may be added easily and inexpensively by attaching a manual door operating handle within reach of the driver, for instance those now widely in use in passenger buses.

BRIEF DESCRIPTION OF THE DRAWINGS

For a better understanding of the invention, reference is made to the following detailed description and the accompanying drawings, in which:

FIG. 4 is a plan view, in section, of the standard van-type vehicle of FIG. 1;

FIG. 5 is a plan view, in section, of the converted van-type vehicle of FIGS. 2 and 3, also in section;

FIG. 6 is a passenger side perspective view of the passenger door entrance way modified in accordance with the present invention;

FIG. 7 is a detailed view of the chassis extension members for the longitudinally extending support members of the chassis; and FIG. 8 shows a modified form of the chassis extension members of FIG. 7.

DETAILED DESCRIPTION

Figure 1:
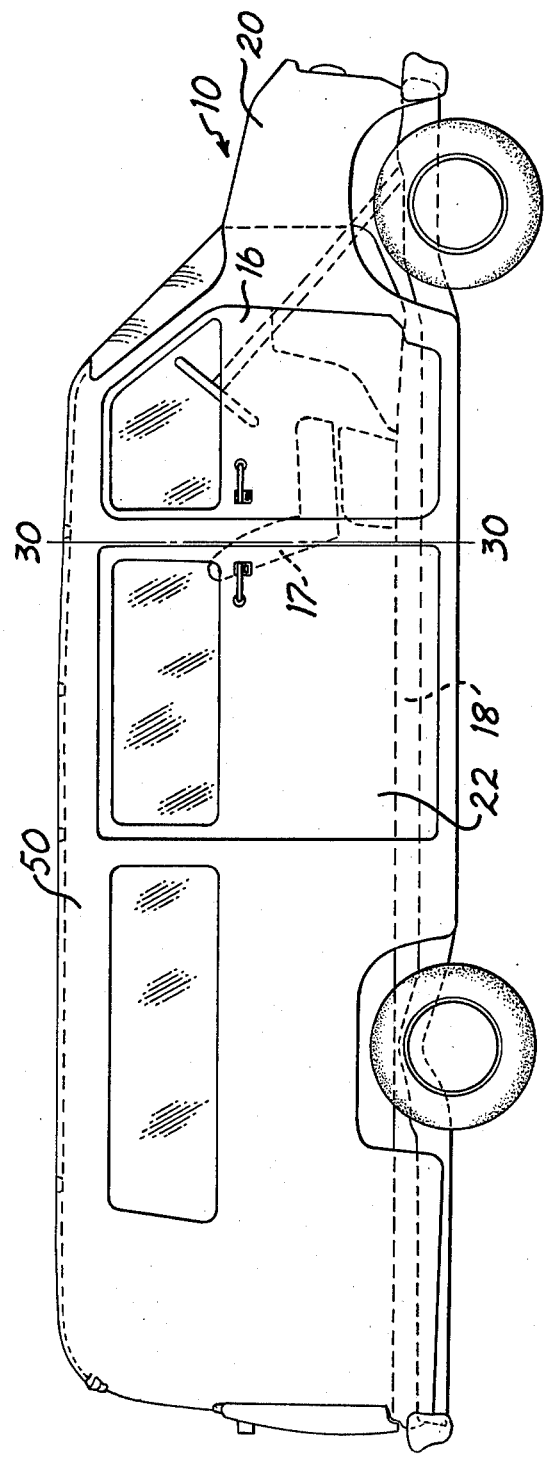
FIG. 1 is a side view of a standard production van-type vehicle having a chassis.
Figure 2:
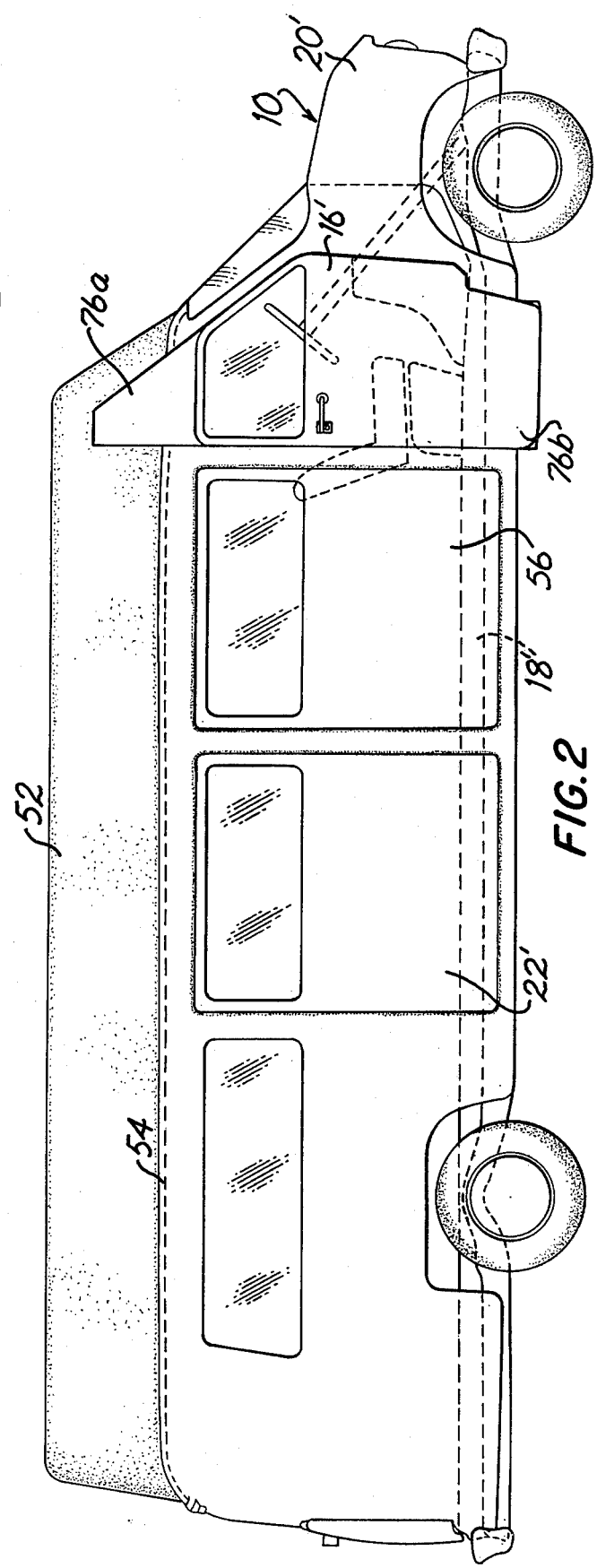
FIG. 2 is a corresponding view of the van-type vehicle of FIG. 1 modified in accordance with the method of the present invention.
Figure 3:
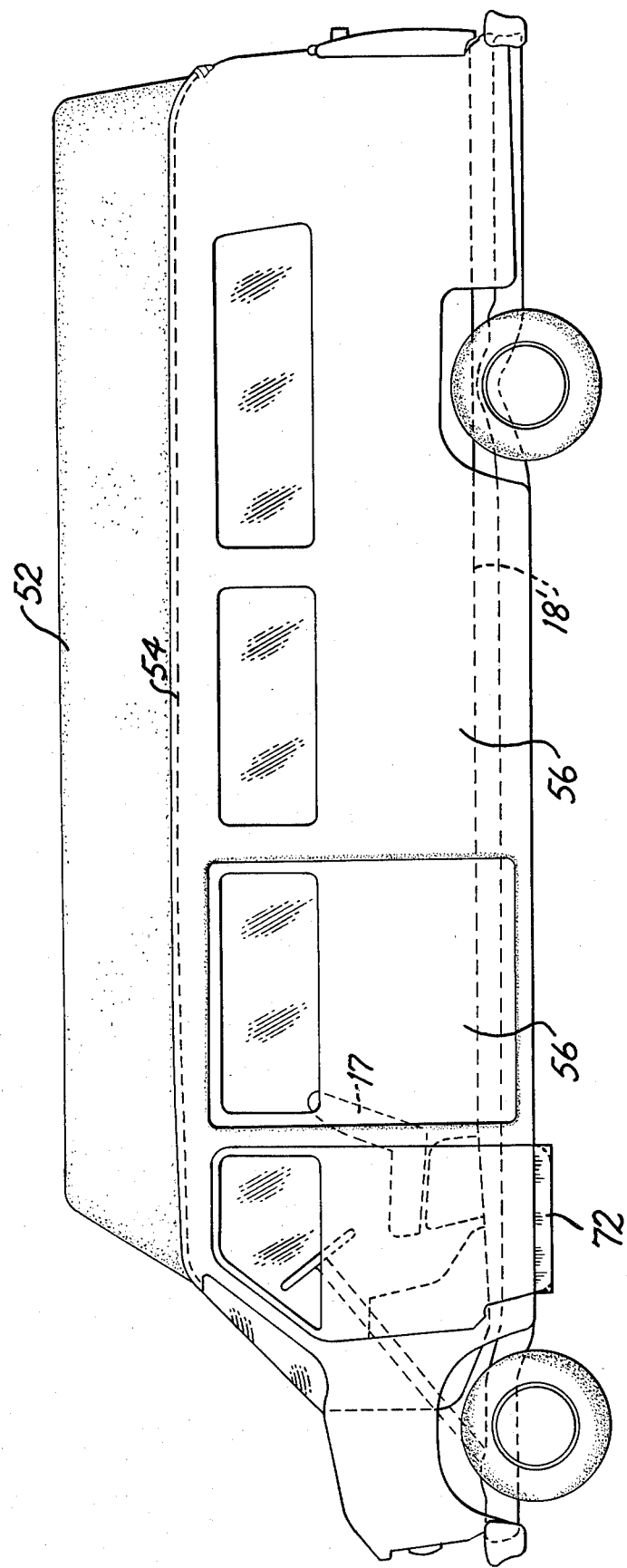
FIG. 3 is a driver's side view of the vehicle of FIG. 2.

Referring to the drawings, a standard production van-type vehicle 1 is shown in FIGS. 1 and 3, and such vehicle converted to a multi-passenger transportation vehicle 10 in accordance with the present invention is shown in FIGS. 2, 3 and 5. The vehicle 10 generally includes a driver door 14 and passenger door 16 adjacent the front seats 17 of the vehicle. A chassis carries the vehicle body 20, and has a pair of longitudinally extending support members 18 and one or more cross support members 19. The vehicle also includes an auxiliary cargo door 22 on the side of the vehicle behind the passenger door. One such vehicle having this structure including the chassis and vehicle body is a Ford, Econoline model, van.

In accordance with the invention, the vehicle body 10 and chassis 18 are first cut in a plane substantially transverse of the longitudinal support members 18, indicated at 30, directly behind the front doors, and thereafter the forward and rear sections are separated. A pair of chassis extension support members 32 are positioned coaxially with the forward 18a and rear 18b sections of each longitudinal support member, and attached at each end to each member.

One of the preferred methods of attaching extension support members 32 is shown in FIG. 7. The forward and rear support members, 18a and 18b respectively are shown in phantom. The extension member 32 is shown as a pair of mating channel members, 32a, 32b. The oversized extension member 32a receives the forward 18a and rear 18b longitudinal support chassis members. The inner, smaller extension member 32b is the same size as the support members 18a, 18b, and is received in the outside extension member 32a as a spacer between the cut ends of the chassis support members, 18a, 18b to provide precise longitudinal positioning as well as torsional strength and rigidity. Alternatively, as shown in FIG. 8, the inner extension channel member 32b may be sized to be received in the chassis members 18a, 18b, so that the outer 32a and inner 32b extension members sandwich the chassis members 18a, 18b.

In either case, all the chassis members and extension members 18a, 18b, 32a, 32b, are attached, preferably by welding, to result in a secure and stable chassis for supporting the vehicle body. To assure proper lateral and torsional support, one or more cross support members 19' may be added. For example as shown in FIG. 5, where the original cross support member 19 was removed at the time the chassis was extended, a pair of cross support members 19' may be re-attached. This entire process may be done without any substantial interference from the existing vehicle body, since all the work is done in the exposed spaced between the forward and rear sections of the van.

With the chassis thus modified, the vehicle body may now be re-constructed for commercial passenger use. The existing front seat of the vehicle is removed to provide space that will be used as the passenger entrance way. Floor paneling may be added to the existing floor 40 in the cutout area 42 between the forward and rear sections of the vehicle body, and also along the cargo door entrance way, to provide contiguous flooring extending the length of the vehicle. This is possible because the cargo door will no longer be used for entrance or exit from the vehicle, and thus this space may be used for passenger seats or baggage area. Sheet metal or any other suitable material may be used for this purpose.

At some point in the operation, the stock roof 50 is replaced with an extended roof 52 to provide added headroom. This may be done by cutting off the existing roof of the vehicle body along the periphery 54 of the upper vehicle body, and thereafter replacing the roof 50 with an enlarged roof 52 by attaching it along the line of cut 54. The roof 52 may be retained in any suitable manner, such as by roof clips (not shown) spaced around the roof periphery 54, and sealed. These replacement roofs need not be of sheet metal, as was the original roof, but may easily be fabricated from fiberglass or molded plastic.

The side of the vehicle body is enclosed by first sealing or welding shut the cargo door 22', and adding a pair of standard side support members 56 to either side of the open space. The side wall members 56 are readily available as replacement parts for the original side panel member 56 of the van, and thus a pair of those members 56 may be welded in place on either side of the open areas between the front and rear portions of the van body. The cargo door 22 shown in the drawings is a sliding cargo door, the standard type that, when opened, extends several inches from the side of the vehicle, and thereafter slides towards the rear. Those types of doors may be welded readily in their closed position, and will offer a secure and attractive side member, when permanently in place, with a minimum of body finishing. In the case of some vans that have double doors (swing open doors), it may be more desirable to replace those doors with a third side support member 56, rather than welding those shut, since they may detract from the appearance of the vehicle, and may not be as sturdy as the unitary sliding door. Once the two side members 56 and cargo door 22' (or third side extension member) have been welded in place, the vehicle body is normally then sanded and finished to provide a smooth continuity of the entire sidewall of the vehicle, and remove the appearance of the assembled configuration.

The modification of the passenger door 16 and entrance way 17 will now be explained. In normal van vehicles, when the passenger door opens there is a small step board 17 at about the level of the rocker panel 60 (FIG. 6) which allows a passenger to put one foot in the step while climbing up onto the vehicle floor 40 and into the passenger seat. Such limited entrance way is impractical for commercial loading and unloading of passengers, notwithstanding the fact that the passenger seat is in the way, both because of the size of the step board and the extent of the step up required. In order to accommodate the transmission and exhaust systems of the vehicle, van floors tend to be quite high off the ground. In accordance with the present invention, the passenger seat has already been removed or should now be removed. The passenger entrance into the vehicle is modified to provide easy entrance. The existing step board is removed from the vehicle body and additional flooring is cut out of the floor 40 to accommodate a new step well 70. The step well 70 may be a cubical metal insert, which is attached to the vehicle body in the cutout portion 17' of the floor 40. The floor portion 72 of the step well 70 is disposed below the rocker 60 to provide easy step up into the vehicle and onto the vehicle floor 40. A light 74 may be provided for the safety of the passengers when boarding in poor light.

In addition to the step well 70, a roof cutout 80 is also formed in the new roof 52 in the area above the door extending partially upward from the periphery 54 as a continuation of the door opening. The combination of the lower height of the step well floor 72 and the roof cutout permit passengers to board and unboard without having to bend over or without hitting their heads. This is particularly advantageous where passengers are carrying luggage or bulky packages. Once inside the van, of course, adequate headroom to move around is provided by the extended roof 53.

The door 16 is preferably modified as shown in 16' by providing door extension sections 76a, 76b on the upper and lower ends for closing the passenger door opening when the door is closed.

Finally, a driver operated control 100, which may be a hand control, is attached to the door 16', operable from the driver's seat. A standard type of bus door handle and mechanism may be used. Alternatively, a motor driven door opening mechanism may be installed.

When modified in accordance with the present invention, it becomes apparent that the vehicle offers exceptional possibilities for use in the carrying of commercial passengers. For the first time in the case of a van-type vehicle, passengers may enter and leave the vehicle quickly and easily through the modified passenger entrance door 16', which can at all times be under the control of the vehicle driver through the use of a hand lever. This would obviate the need for an electric motor driven passenger door, or if used, would simplify considerably its installation, as opposed to trying to adapt the side cargo doors. At the same time, passengers may enter and leave the vehicle easily without having to stoop, bend or make the high step up into the vehicle otherwise required. Once inside the vehicle, headroom and interior spaciousness offer freedom of movement around the vehicle, and eliminate any feeling of cramping.

At the same time, the modified body and chassis design of the vehicle conform to provide a stable and desirable construction, which is not prone to rattle or shake as in the case of some prior art adaptations of vans, which shortly become dilapidated. Thus a long service life is provided and attractive appearance maintained. Finally, the conversion of the van-type vehicle in accordance with the present invention may be done without a considerable outlay of cost, time, or effort which provides a practical means of constructing such a vehicle without complete remanufacturing. It is the very provision of such simplicity and cost feasibility in reconstruction and modification which has been lacking in the industry, and epitomizes the relative need in the industry for such vehicle as disclosed in the present invention.

Although the invention has been shown and described with reference to a preferred method and details of construction, it will be understood that the principles of the invention may be subject to certain modifications and variations without departing from the inventive principles disclosed herein. All such modifications and variations are intended to be within the scope of the present invention, as defined in the following claims.

I claim:

1. A method of converting a van-type vehicle to a multi-passenger commercial transportation vehicle, said vehicle having front and rear wheels, a chassis mounted on said wheels carrying a vehicle body and having two or more longitudinally extending support members, said vehicle body having a driver door, and a passenger door adjacent the front seats of said vehicle, and an auxiliary cargo door and cargo door entrance way on one side of said vehicle behind either of said driver or said passenger door, comprising the steps of:
   (a) cutting, in a plane substantially transverse of said longitudinal support members, both said chassis and said vehicle body into a forward section and a rear section, said plane lying between the forward and rear wheels of the vehicle;
   (b) separating longitudinally said forward and rear sections;
   (c) attaching coaxially a chassis extension support member between the forward and rear sections of each said longitudinal support member;
   (d) cutting off the roof portion of said vehicle body along the periphery of the upper vehicle body;
   (e) attaching an upwardly enlarged roof portion to said vehicle body along said periphery;
   (f) attaching fixed side wall members, flush with the side walls of said forward and rear sections, to said cargo door entrance and to said vehicle body on either side thereof and fitted to extend between said forward and rear sections;
   (g) removing said passenger's seat and attaching a step well means to said vehicle frame adjacent said passenger door and forming a continuation of the passenger door opening for permitting step up into said vehicle;
   (h) forming a roof cutout extending partially upward from said periphery in said roof portion in the area above said step well means as a continuation of the passenger door opening to provide uninhibited passenger boarding and unboarding to and from said vehicle;
   (i) providing door extension means on the upper and lower ends of said passenger door for closing said passenger door opening when said door is closed; and
   (j) attaching door opening means operable from the driver's seat for opening said passenger door.

2. A method according to claim 1, wherein said plane of cutting is directly behind the front doors of said vehicle.

3. A method according to claim 2, wherein said vehicle body includes a standard side panel member on the side of said vehicle opposite said cargo door and forming part of the side wall of said vehicle, said forward and rear sections are separated a distance approximately equal to the width of said standard member, and a standard side panel member is attached to said vehicle body on either side thereof and fitted to extend between said forward and rear sections.

4. A method according to claim 2 or 3, wherein said cargo door is welded shut.

5. A method according to claim 3, wherein said cargo door is removed, and replaced with a standard side panel member fitted into said cargo door entrance way.

6. A method according to claim 1, wherein the cut ends of the forward and rear sections of each longitudinal support member are fitted in an outer chassis extensive member adapted to receive said ends and an inner extension member, and an inner extension member is fitted to extend between said ends and be received in said outer chassis extension member.

7. A method according to claim 6, wherein said outer and inner chassis extension members are channel shaped.

8. A method according to claim 1, wherein an outer chassis extension member and an inner extension member are attached to the cut ends of the forward and rear sections of each longitudinal member on either side thereof.

9. A method according to claim 8, wherein said outer and inner chassis extension members are channel shaped, and said ends and said inner chassis extension member are adapted to be received in said outer extension member.

10. A method according to claim 9, wherein said chassis has two longitudinal support members, further comprising attaching one or more cross support members between said longitudinal support members.

11. A method according to claim 1, wherein the door opening means is a hand operated lever mechanism coupled to the door and having a handle within reach of the driver's seat for actuating the mechanism.

* * * * *